Figure 1:
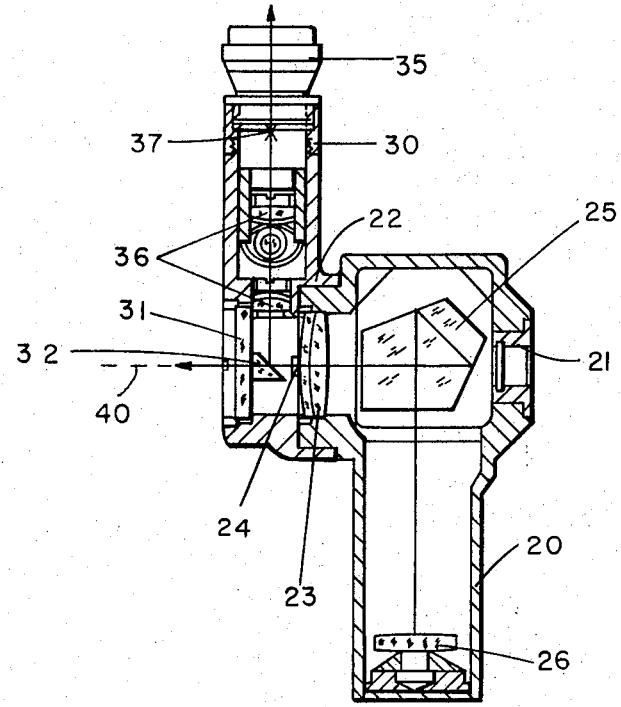

Dec. 5, 1967  A. L. BAKER  3,355,981

RIGHT-ANGLE VIEWING ATTACHMENT

Filed Sept. 25, 1963

INVENTOR.
ALLISTER L. BAKER
BY Peter F. Willig
ATTORNEY

United States Patent Office 3,355,981
Patented Dec. 5, 1967

3,355,981
RIGHT-ANGLE VIEWING ATTACHMENT
Allister L. Baker, Denville, N.J., assignor to Keuffel & Esser Company, Hoboken, N.J., a corporation of New Jersey
Filed Sept. 25, 1963, Ser. No. 311,508
6 Claims. (Cl. 88—14)

The present invention relates to aligning instruments and refers more particularly to an attachment for determining the alignment of an instrument with respect to a reference line of sight.

Precise measurements are difficult to make in the alignment of machine parts, jigs and work pieces, especially for complex structures. Optical tooling is therefore used. A reference line of sight is established and a mobile transit mounted with respect to the line provides measurements of points with respect to the line. One difficulty, however, is the time-consuming and tedious process of realigning the transit every time it is moved or a check is required.

It has been the practice to align a transit along a reference line of sight by tediously adjusting the position of the transit and checking the position of the transit with respect to the line of sight from one of the points determining the line of sight. When the points were widely separated and when the transit was located somewhere near the middle of the line, the process of aligning or checking the position of the transit required the services of two operators or else the lone operator was required to adjust the transit and to check the line of sight. This was time-consuming and, therefore, expensive.

It has now been found that the operation of aligning a transit with respect to a reference line of sight can be accomplished by a single operator in a short time by means of the present invention.

One object of the present invention is to provide an instrument which permits quick and simple alignment of a transit or the like with respect to a reference line of sight.

Another object is to provide an attachment for an instrument for determining the alignment of the instrument with respect to a reference line of sight.

Another object is to provide a side telescope with a folded optical system for aligning a transit or the like along a reference line.

Other objects will become apparent during the course of the specification.

Figure 2:
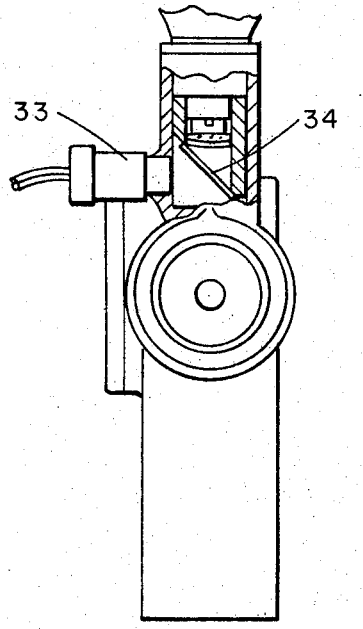

In the drawings:

FIGURE 1 is a front elevation of a right-angle viewing attachment for a transit with parts exposed to reveal the folded optical system; and FIGURE 2 is a side view of the attachment with a portion exposed to show the beam splitter.

Briefly, the present invention involves setting up a reference line of sight by means of a collimated beam of light and a suitably mounted target or reflecting surface. The attachment connected to an axis of the instrument such as a transit is then used to determine the alignment of the instrument with respect to the reference line of sight. This is done by comparing a target image superimposed on a reference image. A collimated light beam is used to project the target image. Superposition of the two images indicates alignment whereas lack of superposition of the images indicates the need for adjustment of the transit.

Alignment can be checked in a few seconds and adjustments can be made promptly without tedious adjusting and rechecking as would be the case where a mirror mounted on the instrument and an autocollimator are used. Thus considerable time is saved. In addition, the checking and adjusting steps require the services of only one man, thus saving much time and effort.

Referring to FIGURE 1, the right-angle viewing attachment comprises a first barrel 20 enclosing a folded optical system, which barrel is mountable on the horizontal axle of a transit (not shown) and a second barrel 30 mounted on the first barrel 20 so that the axes of both barrels are perpendicular to a transverse axis common with the axis of the horizontal axle.

The first barrel 20 is provided near one end with a screw thread 21 for connecting the barrel 20 to the horizontal axle of a transit so that the longitudinal axis of the barrel 20 intersects and is perpendicular to the horizontal axis of the transit. The horizontal axle and the axis of the threads are coincident with the reference line of sight 40 and the transverse axis of the attachment. On the opposite side of the barrel 20 on a line coincident with the axis of the thread is a hollow cylindrical projection 22 within which is mounted a convex lens 23 having its axis coincident with the transverse axis of the attachment. A reticle 24 is mounted on the center of the outside surface of the convex lens 23 with its axis coincident with the transverse axis. The diameter of the reticle 24 is smaller than that of the convex lens 23. Between the convex lens 23 and the thread 21 is mounted a deflector such as a pentaprism 25 so that a beam of light coming through the reticle 24 and lens 23 along the transverse axis is deflected 90 degrees into a path coincident with the longitudinal axis of the barrel 20 and vice versa.

At the distal end of the barrel 20 is mounted a convex mirror 26 positioned so that an image coming from the penta-prism 25 along the axis of the barrel 20 is reflected back to the penta-prism 25 along the same axis. Thus a beam of collimated light aimed at the reticle 24 along the transverse axis illuminates the reticle 24, and the image carrying light from the reticle after passing through the folded optical system consisting of lens 23, pentaprism 25, convex mirror 26, pentaprism 25, and lens 23 emerges as collimated light.

A second barrel 30 is mounted on the projection 22 so that the longitudinal axis of the second barrel 30 is perpendicular to the transverse axis of the attachment. The second barrel 30 has a common opening with the first barrel 20 and a window opening on the other side of the barrel directly opposite the common opening and in line with the transverse axis. An eyepiece opening in the distal end of the second barrel 30 is in line with the longitudinal axis of the second barrel. The second barrel 30 can be fixedly mounted to the first barrel 20 to form a housing unit or it can be rotatably mounted on the first barrel 20. The housing unit can be rotatably mounted to the instrument.

A transparent window 31 is mounted in the window opening with its axis coincident with the transverse axis. A reflector 32 is mounted in the center of the inside surface of the transparent window with its reflecting surface at the intersection of the longitudinal axis of the second barrel 30 and the transverse axis such that a beam of light along one axis is reflected to the other axis and vice versa. The reflector 32 is smaller in diameter than the window 31 and has preferably the same diameter as the reticle 24.

Two components of an erector lens system 36 are mounted in the second barrel 30 with their axes common to the longitudinal axis of the barrel 30. An eyepiece 35 is mounted at the distal end of the barrel 30 with its axis coincident with the longitudinal axis of the barrel 30. The image of the reticle 24 is seen in the eyepiece 35 by means of the reflector 32 and the components of the erector lens system 36.

Thus a target image projected by a beam of collimated light, which defines a reference line of sight, can pass through the window 31 past the reflector 32 and reticle 24 and through the convex lens 23, into the pentaprism 25 where it is deflected to the convex mirror 26. The reflected target image from the mirror 26 is then deflected by the pentaprism 25 through the convex lens 23 to the image face of the reticle 24 where the target image is focused on the reference image. The two images are then viewed by means of the reflector 32, the components of the erector lens system 36, and the eyepiece 35. Precise superposition of the target image on the reference image indicates perfect alignment of the axle of the transit to the reference line of sight. Any deviation from perfect superposition indicates misalignment and the need for adjustment.

A light source 33 for auto-collimation can be mounted at a right angle to the axis of the barrel 30 near its middle so that a beam of collimated light can be projected through the longitudinal axis of the barrel 30. A partially reflective beam splitter 34 mounted in the barrel 30 at the juncture of the light beam and the longitudinal axis of the eyepiece barrel 30 deflects part of the collimated light beam from the light source 33 to a path common with the axis of the barrel 30 to the reflector 32 and thence to the reticle 24. On both sides of the partially reflective beam splitter 34 along the longitudinal axis of the second barrel are mounted components 36 of an erector lens system which transfers the image of the reticle to the focal point 37 of the eyepiece 35 mounted in the distal end of the barrel 30.

In operation, the light source 33 projects a beam of collimated light to the partially reflective beam splitter 34 where part of the light beam is deflected along the axis of the eyepiece barrel to the reflector 32 and then through the reticle 24. The image of the reticle 24 passes through the lens 23 and to the penta-prism 25 where it is deflected 90 degrees to the convex mirror 26 from which the image is reflected in magnified form. The magnified image is then deflected 90 degrees by the penta-prism 25 back into the direction from which it originated. It passes back through the convex lens 23 now being collimated light and through the transparent window 31 except for the area covered by the reflector 32. When this image strikes a reflecting surface such as a target mirror or reference line 40 it is reflected back through the window 31, the lens 23, and the penta-prism 25 to the convex mirror 26 where it is reflected in reduced size back onto the penta-prism 25. It is then deflected through the lens 23 and reticle 24 where the image of the reticle is formed in superimposed position on reticle 24, then to the reflector 32 and thence through the partially reflective beam splitter 34 to the eyepiece 35 where it is viewed by the eye. The position of the reflected image is compared with that of the reticle image. When all elements are perfectly aligned, the reflected image is superimposed upon the reference image, and no adjustment of the transit is required. When the images are not superimposed, adjustment of the transit is required. This is accomplished by moving the transit or adjusting the various leveling screws on the transit.

When the target image and collimated light beam originate from outside the attachment then the beam defines the reference line of sight. When the target image and collimated light beam originated from within the instrument then the reference line of sight is determined by a line normal to a reflecting surface.

It is apparent that the present invention is capable of many variations and modifications within the scope of the present invention. All such variations and modifications are to be included within the scope of the present invention.

What is claimed is:

1. A right-angle viewing attachment for determining the alignment of a jig transit with respect to a reference line of sight defined by a beam of collimated light and a target image, which comprises:

a first barrel for mounting on a side near one end to the horizontal axle of a transit with the longitudinal axis of said first barrel intersecting the axis of said axle at right angles, said first barrel having an opening on the side directly opposite the mounted side with the center of the opening coincident with the axis of said axle;

a convex lens mounted in the opening of said first barrel with the axis of the lens coincident with the axis of said axle;

a reticle mounted on the center of the outer surface of the convex lens with its axis coincident with the axis of the convex lens, which reticle has a diameter smaller than that of the convex lens;

a penta-prism mounted in the proximal end of said barrel with one of the two image-entering faces perpendicular to the axis of the axle and the other face perpendicular to the longitudinal axis of said first barrel to change the direction of a transmitted image 90 degrees from one axis to the other;

a convex mirror mounted at the distal end of said first barrel with its axis coincident with the longitudinal axis of said first barrel;

a second barrel mounted near one end of said barrel around the opening of said first barrel with the longitudinal axis of said second barrel intersecting the axis of the horizontal axle perpendicularly, said second barrel having an eyepiece opening at the distal end, a common opening with said first barrel, and a window opening near the proximal end directly opposite the common opening;

an eyepiece mounted in the distal end of said second barrel with its axis coincident with the longitudinal axis of said second barrel;

an erector lens system mounted in said second barrel with the axis of each component coincident with the longitudinal axis of said second barrel;

a transparent window mounted in the window opening with its center coincident with the axis of the axle; and a reflector mounted on the center of the inside surface of said window with the center of its reflecting surface at the intersection of the longitudinal axis of said second barrel and the axis of the axle to direct a beam of light coincident with longitudinal axis of said second barrel into a path coincident with the axis of the axle and vice versa, which reflector has a diameter smaller than that of the window and approximately equal to that of the reticle;

a source of light mounted on said second barrel;

a beam splitter in the second barrel in the path of a beam of light from said source of light whereby the beam of light is reflected to said reflector;

whereby the target image and beam of collimated light define the reference line of sight and pass through the transparent window, convex lens, and pentaprism to the convex mirror where the beam is reflected back through the pentaprism and convex lens to the reticle where the received target image is superposed on the reticle image for visual determination of the relative superposition of the received target image on the reference image, which superposition indicates the alignment of the transit with respect to the reference line of sight.

2. The attachment of claim 1 in which said second barrel is rotatably mounted on said first barrel with its plane of rotation perpendicular to the axis of the horizontal axle.

3. The attachment of claim 1 in which said first barrel is rotatably mountable on the horizontal axle of a transit.

4. A right-angle viewing attachment for determining the alignment of a jig transit with respect to a reference line of sight defined by a line normal to a reflecting surface, which comprises:

(1) a first barrel for mounting on a side near one end to the horizontal axle of the transit with the longitudinal axis of said first barrel intersecting the axis of the axle at right angles, said first barrel having an opening on the side directly opposite the mounting side with the center of the opening coincident with the axis of the axle;

(2) a folded optical system mounted in said first barrel for transmitting a target image to a reflecting surface and receiving a reflected target image therefrom, said system comprising:

(2a) a convex lens mounted in the opening of said first barrel with the axis of said lens coincident with the axis of the axle;

(2b) a pentaprism mounted in the proximal end of said first barrel with one of the two image-entering faces perpendicular to the axis of the axle and the other face perpendicular to the longitudinal axis of said first barrel to change the direction of an image along one of the axes 90 degrees to a direction along the other axis; and (2c) a convex mirror mounted in the distal end of said first barrel with the axis if said mirror coincident with the longitudinal axis of said first barrel;

(3) a second barrel mounted near one end to said first barrel around the opening of said first barrel with the longitudinal axis of said second barrel intersecting the axis of the horizontal axle perpendicularly, which second barrel has an eyepiece opening at its distal end, an opening common with the opening of said first barrel, and a window opening near the proximal end directly opposite the common opening;

(4) viewing means mounted in said second barrel and optically aligned with said folded optical system for comparing the relative superposition of a received target image on a reference image, which viewing means comprises:

(4a) an eyepiece mounted in the distal end of said second barrel with its axis coincident with the longitudinal axis of said second barrel;

(4b) an erector lens system mounted in said second barrel with the axis of each component coincident with the longitudinal axis of said second barrel;

(4c) a transparent window mounted in the window opening of said second barrel with the center of said window coincident with axis of the axle;

(4d) a reflector mounted on the center of the inside surface of said window with the center of the reflecting surface at the intersection of the longitudinal axis of said second barrel with the axis of the axle for directing a beam of light coincident with the longitudinal axis of said second barrel into a path coincident with the axis of the axle and vice versa, which reflector has a diameter smaller than the window; and (4e) a reticle mounted on the center of the outer surface of said convex lens with the axis of said reticle coincident with the axis of said convex lens and the axle, said reticle being smaller in diameter than said convex lens and approximately equal to that of the reflector;

(5) image-forming means mounted in said second barrel and optically aligned with said folded optical system for forming a target image, which image-forming means comprises:

(5a) a partially reflective beam splitter mounted in said second barrel between the components of said erector lens system with its center coincident with the longitudinal axis of said second barrel for directing a beam of collimated light to a path common with the longitudinal axis of said second barrel;

(5b) a light source providing a beam of light mounted on said second barrel with its beam directed to said beam splitter and thence to said reflector and to said reticle;

whereby a target image is formed by directing a beam of light to the reticle and transmitted through the folded optical system collimating the light which strikes the reflecting surface of a target from which it is reflected back through the folded optical system to the reticle where the reflected target image is superimposed on the reticle and compared with the reticle to determine the alignment of the instrument with respect to the reference line of sight.

5. The attachment of claim 4 in which said second barrel is rotatably mounted on said first barrel with its plane of rotation perpendicular to the axis of the horizontal axle.

6. The attachment of claim 4 in which said first barrel is rotatably mountable on the horizontal axis of a transit.

References Cited

UNITED STATES PATENTS

| 1,134,388 | 4/1915 | Kollmorgen | 88—2.2 |
| 2,679,181 | 5/1954 | Keuffel et al. | 88—2.3 |
| 2,701,501 | 2/1955 | Cuny | 88—14 |
| 3,013,464 | 12/1961 | Keuffel et al. | 88—2.3 X |

FOREIGN PATENTS

| 370,626 | 2/1907 | France. |

OTHER REFERENCES

"Principles and Applications of Alignment Telescopes," A. Metz, Instruments & Automation, vol. 27, October 1954, pp. 1634–1935. Q 184 I 59.

JEWELL H. PEDERSEN, *Primary Examiner.*

W. A. SKLAR, *Assistant Examiner.*